Patented Aug. 11, 1931        1,818,088

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE ELEMENT

No Drawing.        Application filed October 6, 1928. Serial No. 310,932.

This invention relates to brake elements and pertains more specifically to a method of attaching friction facings to brake shoes or straps.

As is known a brake stator comprises a metallic band or shoe to which is securely attached a friction facing. This facing is usually comprised of a woven asbestos fiber which is impregnated with a material which increases its coefficient of friction. In order that the facing should function efficiently it should be impregnated uniformly with a material which is heat resistant and which will increase the retardation effect of the fiber. It is of importance that the facing should possess a certain degree of pliability or softness. As will be understood if the lining becomes hard because of carbonization at high temperatures a glaze is worn on the surface and in operation will tend to grab or chatter. If however, the lining is relatively soft it serves to some degree as a buffer and insures a more smooth braking action and greater retardation.

As customarily manufactured the brake lining comprising the woven (or felted) asbestos is first impregnated with the binder and is then applied to the brake shoe or strap. The shoe or strap is then placed in storage until shipped to supply a demand.

The binder employed generally comprises vegetable oil or gums and heavy hydrocarbons such as asphalts and bitumens. These are first dissolved in suitable solvents such as benzine, benzene, coal-tar naphtha, petroleum naphtha, alcohol, etc. The lining is impregnated with the solution of the binder and is subsequently dried and cured at elevated temperatures.

The object of the present invention is to provide a method of preparing brake shoes by which the friction facing in the shoe as sold is in a fresh condition and at its maximum efficiency.

Another object of this invention is to provide a process for manufacturing brake shoes which permits of indefinite storage without deleterious effects.

A further object is to devise a method of preparing brake elements having a friction facing in which the impregnant is applied just prior to the actual use of the element.

With these and other equally important objects in view the invention comprehends a novel method of manufacturing brake shoes by which the unimpregnated fibrous material is first affixed to the shoe and is then stored; when the shoe is to be mounted in position it is then impregnated with a binder.

In carrying out the invention the woven or felted asbestos tape is cut to length and secured to the brake shoe or strap by any suitable means as for example by countersunk rivets, in the manner well known in the art. Operating in such a manner it is possible to make up any predetermined number of shoes and place them in storage subject to the demand for use.

When it is desired to prepare the shoes for ultimate braking use they are removed from storage and the friction facing treated with a suitable binder. In this way the shoe as sold comprises a freshly treated friction facing and possesses its maximum efficiency.

The shoe may be treated with any of the usual types of impregnants. As a typical method of treatment the shoe with its attached lining may first be placed in a pressure tight container and heated gently under subatmospheric pressure. This treatment will remove any moisture which may have been absorbed by the fiber during storage and will accelerate the subsequent penetration by the impregnant.

As has been noted a wide variety of specific impregnating solutions may be employed. These may comprise a mixture of a resin in a drying oil or relatively heavy hydrocarbons such as mineral oils or gums, asphalts or bitumens dissolved in a suitable solvent such as benzene, naphthas, alcohol, acetone, amyl acetate, etc. The choice of these is wide and well known to those skilled in the art.

To accomplish this impregnation the entire shoe may be immersed in the impregnating solution and allowed to remain until the desired impregnation has been achieved.

If desired the fluid binder may be admitted to the pressure vessel in which a partial vacuum obtains. It will be understood that the preliminary evacuation of the lining having removed the moisture and occluded air will permit a rapid and thorough penetration by the binder.

After the impregnating treatment the metallic portion of the shoe may be brushed with a solvent to remove any adherent impregnant. It will be appreciated that if desired, before the impregnating step the exposed metallic portions of the shoe may be coated with any suitable material such as a heavy oil, paste or wax to prevent adherence of the impregnant to the metal. After impregnation this may be washed or brushed off.

Upon completion of the impregnation the friction facing is then dried and cured. In the drying oven the material is heated to 200° F. more or less and the resulting volatilized solvents recovered by passing them through a suitable condenser. After drying the shoe may then be placed in a curing oven where it is heated at temperature ranges from 250° to 400° F. more or less to impart to the facing the desired hardness.

After the friction facing has been impregnated and cured the shoe may be assembled in a suitable form and the surface ground down to insure a surface which will be concentric with the drum to which it is later applied.

It will be understood that the friction material may be subjected to mechanical pressure to render it more dense. The amount of pressure should be in excess of that to which it is subjected during braking action. The advantage of such a treatment is that the lining is compressed initially to at least that degree which would be obtained during braking and hence no clearance factors resulting from running in the lining need be considered. This insures a fixed clearance between the friction material and drum and therefore obviates the necessity of constant adjustment for clearance during the early stages of use on the vehicle.

It will be appreciated that this pressure treatment may be effected either before or after the impregnation. It is advantageous to carry out such a treatment after the lining has been affixed to the shoe. In this manner the friction material is compressed on the shoe itself which in effect serves as a die block. The lining is then made to conform to the particular curvature of the shoe and any irregularities in the surface are removed by the subsequent grinding.

It will be observed that the present method presents many advantages. In the first place it insures operating economies for it enables the manufacture of shoes during slack times and the establishment of a large reserve. Upon demand of the trade the shoes may be removed from storage and impregnated with the desired binder. By applying the binder to the lining while the latter is in that shape in which it is used, the binder is fixed in the fibers of the material as, so to speak, a curved tenuous coating. This obviates any danger of fracturing the resinous material which forms as a result of the drying and curing and insures a continuity of binder with its attendant advantages. This as will be appreciated is an important feature in a material which is subjected to abrasive and shearing stresses. The material which is employed for the lining presents little if any imbibition effects and hence the unimpregnated tape may be applied to the shoes without the necessity of substantial elongation tolerances.

While I have described a specific process for effectuating the principles of the invention it is to be understood that this is given merely as an example for obviously it is susceptible of modification as to the materials employed and the sequence of step to suit the exigencies of a particular equipment. All such changes which would naturally suggest themselves to those skilled in the art are considered to fall within the scope of the invention.

I claim:

1. A process of making brake linings comprising attaching a woven fibrous material to the brake element, subjecting the lining to elevated temperatures and subsequently impregnating the lining.

2. A process of making brake linings comprising attaching a woven fibrous material to a brake element, subjecting the lining to mechanical pressure to compress it and subsequently impregnating the material with a suitable binder.

3. A process of preparing friction brake shoes comprising attaching a strip of a fibrous friction material to the shoe, subjecting the material to elevated temperatures and reduced pressures to remove moisture and then impregnating the material with a suitable binder.

4. A process of preparing the friction brake shoes comprising attaching a strip of fibrous friction material to the shoe, subjecting the material to a drying treatment and then impregnating it with a suitable binder.

5. A process of making brake shoes comprising attaching a fibrous friction material to the shoe, subjecting the material to an evacuation treatment and then impregnating the evacuated material.

6. A process of manufacturing brake shoes comprising attaching a suitable friction material to the shoe, evacuating the material under heat and reduced pressure and then impregnating the material while in a heated condition.

7. A process of manufacturing brake shoes comprising attaching a woven friction material to the shoes, then impregnating the material with a suitable binder and subsequently grinding the material to conform to the curvature of a drum with which it is used.

8. A process of manufacturing brake shoes comprising attaching a woven friction material to a metallic shoe, treating the exposed metallic portion of the shoe with a temporary protective coating and then immersing the shoe in an impregnating solution.

9. A process of manufacturing brake shoes comprising attaching a woven friction material to a metallic shoe, treating the exposed metallic portion of the shoe with a temporary coating, immersing the shoe in a bath of an impregnant and subsequently removing the coating.

In testimony whereof I affix my signature.

RAYMOND J. NORTON.